United States Patent Office 3,233,610
Patented Feb. 8, 1966

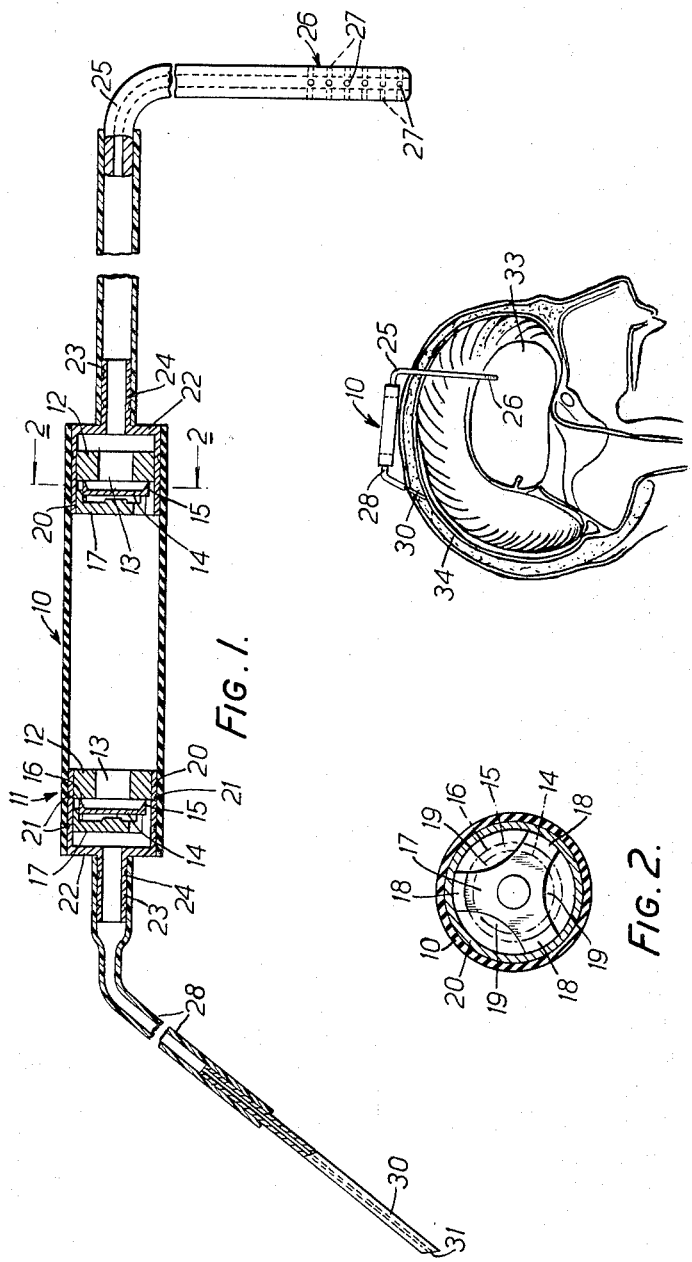

3,233,610
HYDROCEPHALUS SHUNT PUMP
Stanley Charles Wade, 158 W. Wycombe Road,
High Wycombe, Buckinghamshire, England
Filed May 24, 1963, Ser. No. 282,992
Claims priority, application Great Britain, May 28, 1962,
20,478/62
2 Claims. (Cl. 128—350)

This invention relates to apparatus for controlling the flow of fluids, especially applicable for controlling the flow of cerebrospinal fluid during treatment of hydrocephalus.

According to the present invention apparatus for controlling the flow of fluids comprises a valve unit including two non-return valves arranged in series and fluid inlet and outlet connections to the valve unit, one of such connections including a capillary tube. Preferably the valve unit includes a flexible conduit connecting the non-return valves.

At least one of the non-return valves may comprise a valve disc having an annular axially directed flange provided with a knife edge arranged to engage a valve seat, and the valve disc is conveniently housed in a valve cage having axially extending arms surrounding and guiding the valve disc.

Preferably the outlet connection comprises a flexible tube, and in this case the capillary tube may be arranged at the end of the flexible tube remote from the valve unit, and acts as a needle or cannula for insertion in a fluid carrying part of the human body.

The inlet connection may also comprise a flexible tube, and in this case a collecting piece may be provided at the end of the flexible tube remote from the valve unit and including holes arranged around its periphery.

The invention may be carried into practice in various ways but one specific embodiment will now be described by way of example with reference to the accompanying drawings in which:

FIGURE 1 is a longitudinal section through a valve unit according to the present invention, FIGURE 2 is a cross section taken on the line 2—2 of FIGURE 1 and, FIGURE 3 is a view of the valve unit of FIGURE 1 applied to a human head.

The apparatus shown in FIGURE 1 comprises a rubber tube 10 having at each end a non-return valve 11. The non-return valves are arranged in series and each comprises a valve seat 12 in the form of a ring with an opening 13 in its centre.

A valve member is arranged to engage the seat 12 and comprises a disc 14 having an annular axially directed flange 15, the edge 16 of which is machined to a knife edge and which engages the seat 12 when the valve is closed. The disc 14 is constrained to move within the limits of a cage which comprises, as shown in FIGURE 2, a plate 17 having three axially extending arms 18 surrounding the disc. Recesses 19 are provided in the plate 17 to allow fluid to pass. The valve is housed in a cylindrical stainless steel chamber 20 having annular grooves 21 around its periphery, and closed at one end 22 through which extends an integrally formed tube 23 also having grooves 24 around its periphery.

As shown in FIGURE 1, two such valves are provided each in a valve chamber and each valve chamber being connected to the ends of the intervening rubber tube 10 and being held therewith with the aid of the grooves 21 and 24. Connected on to the tube 23 at the right hand of the apparatus is a collecting tube 25 having at its outer end a collecting piece 26 comprising a number of holes 27 arranged symmetrically around its circumference. Connected on to the left hand tube 23 on the apparatus is a delivery tube 28 which has connected to its outer end a capillary tube 30, the open end 31 of which is sectioned at an angle of 45°. The valve units are normally constructed entirely of stainless steel but may be made of standard silver. The seat and cage are pressed into the valve chamber and will not come apart without the use of force.

One application of the apparatus is in the treatment of hydrocephalus in which excess cerebral spinal fluid has to be drawn from the ventricle and passed into a saggital sinus. FIGURE 3 shows the valve unit on the outside of a head with the collecting piece 26 inserted into the ventricle 33 of the brain, and the delivery tube 28 inserted into a saggital sinus 34. When the valve unit is used in this case the dimensions are of considerable importance and in a typical example the dimensions are as follows:

Internal diameter of the chamber 20 .1562″, thickness of the valve disc 14 .124″, lift of the valve within the cage .030″ to .035″, thickness of the axially directed flange 15 .010″.

In the treatment of hydrocephalus the rate of flow of fluid through the valve unit is controlled by the dimensions of the capillary tube and the required flow rate is in the order of 140 to 160 cc. per 24 hours at a pressure difference of 40 mm. of water. Particulars of test results obtained on three specific capillary tubes are as follows:

(1) Stainless steel tube ⅜″ long, 1 mm. outside diameter, .008 internal diameter.

| Pressure: | Centimeters per 24 hrs. |
|---|---|
| 30 | 82 |
| 40 | 134 |
| 50 | 182 |

(2) Silver capillary tube, ⅜″ long x .009″ bore.

| Pressure: | Centimeters per 24 hrs. |
|---|---|
| 30 | 95 |
| 40 | 163 |
| 50 | 216 |

(3) Silver capillary tube, ⅝″ long x .009″ bore.

| Pressure: | Centimeters per 24 hrs. |
|---|---|
| 30 | 146 |
| 40 | 216 |
| 50 | 283 |

The rubber tube 10 connecting the two valve units together provides a pump which can be actuated by applying pressure to the sides of the tube. Thus any blood clots or other particles which form in or near the discharge end of the capillary tube can simply be dispersed by applying pressure, for example with the fingers, to the sides of the tube. Each pump action serves to pump as much as ⅛ cc. of fluid. The construction of the valves with the knife edge, helps to overcome the effect of surface tension and the valve give a very quick closing action in the case of a sudden pressure reversal, so that blood is not allowed to pass back to the brain, which would result in fatality.

In another application of the invention, it can be used for the disposal of urine and in which case a valve seat is made of a suitable magnetic steel and the valve member is magnetised. By varying the degree of magnetism the valve can be arranged to open at a predetermined pressure and closed at zero pressure or on pressure reversal. In this case the chamber and cage are of a non-magnetic material.

What I claim as my invention and desire to secure by Letters Patent is:

1. A hydrocephalus shunt pump for the draining of ventricular fluid in cases of hydrocephalus, comprising a valve assembly having two non-return valves arranged in series, a flexible conduit connecting said valves which form respectively inlet and outlet valves, each valve including a valve disc and a valve seat, said disc having an annular flange terminating in an annular knife edge to engage said valve seat, a valve cage in which said valve disc is housed, said cage comprising axially extending arms circumferentially spaced around and engaging the periphery of said valve disc, and a fluid inlet conduit connected to the upstream side of the inlet valve for the supply of fluid thereto, said inlet conduit having a perforate collecting piece for insertion into the ventricle of the brain, and a fluid outlet conduit connected to the downstream side of the outlet valve to receive fluid therefrom for delivery to a saggital sinus.

2. A hydrocephalus shunt pump for the draining of ventricular fluid in cases of hydrocephalus, comprising two non-return valve units arranged in series and a flexible conduit connecting said valve units, each valve unit comprising a generally cylindrical valve housing comprising a chamber-forming portion and a conduit portion of smaller diameter than the chamber-forming portion, a cylindrical seat in the housing having an outside diameter substantially equal to the inside diameter of the chamber, a valve cage in the housing and having an outside diameter substantially equal to the inside diameter of the chamber and comprising a plate portion extending across the chamber and a plurality of arms integral with and extending axially from the periphery of the plate portion towards the valve seat, the plate portion having recesses in its periphery between said arms to interconnect the opposite sides of the plat portion, a valve disc sliding axially between and engaged by the arms and having an annular flange terminating in an annular knife edge to engage said valve seat, a collecting tube connected to the upstream side of said flexible conduit for the supply of fluid thereto, said collecting tube having a perforate collecting piece for insertion into the ventricle of the brain, and a delivery tube connected to the downstream side of said flexible conduit for insertion into a saggital sinus.

References Cited by the Examiner

UNITED STATES PATENTS

| | | | |
|---|---|---|---|
| 243,121 | 6/1881 | Grant | 128—231 |
| 605,549 | 6/1898 | Johansson | 137—525 |
| 2,481,088 | 9/1949 | Cuskie | 137—525 |
| 2,867,213 | 1/1959 | Thomas | 128—350 |
| 2,969,066 | 1/1961 | Holter et al. | 128—350 |
| 3,020,913 | 2/1962 | Heyer | 128—350 |
| 3,021,841 | 2/1962 | Burks | 128—214 |
| 3,111,125 | 11/1963 | Schulte | 128—350 |

RICHARD A. GAUDET, *Primary Examiner.*

DALTON L. TRULUCK, *Examiner.*